(12) United States Patent
Ohnishi et al.

(10) Patent No.: US 6,348,520 B1
(45) Date of Patent: Feb. 19, 2002

(54) METHOD FOR COLOR MATCHING OF POWDER COATING COMPOSITION

(75) Inventors: Kazuhiko Ohnishi, Yokohama; Yugen Kawamoto; Hidefumi Takanashi, both of Hiratsuka, all of (JP)

(73) Assignee: Kansai Paint Co., Ltd., Amagasaki (JP)

( * ) Notice: Subject to any disclaimer, the term of this patent is extended or adjusted under 35 U.S.C. 154(b) by 0 days.

(21) Appl. No.: 09/494,118

(22) Filed: Jan. 28, 2000

(30) Foreign Application Priority Data

Jan. 29, 1999 (JP) ............................. 11-020968

(51) Int. Cl.⁷ ............................. C08K 7/00; C08K 5/05; C08K 5/09
(52) U.S. Cl. .................... 523/220; 525/934; 524/904
(58) Field of Search ................ 523/205, 204, 523/206, 207, 220; 525/934; 524/904; 106/494, 499

(56) References Cited

U.S. PATENT DOCUMENTS

| | | | | |
|---|---|---|---|---|
| 5,087,680 A | * | 2/1992 | Duan et al. ................ | 526/254 |
| 5,102,452 A | * | 4/1992 | Taskinen et al. ............. | 75/342 |
| 5,319,001 A | * | 6/1994 | Morgan et al. ............. | 523/205 |
| 5,856,378 A | * | 1/1999 | Ring et al. ................ | 523/205 |

FOREIGN PATENT DOCUMENTS

| | | | |
|---|---|---|---|
| JP | 48097942 | * | 12/1973 |
| JP | 03165827 | * | 7/1991 |
| JP | 07188586 | * | 7/1995 |

OTHER PUBLICATIONS

English Translation of JP 07188586, 1995.*

* cited by examiner

*Primary Examiner*—Vasu Jagannathan
*Assistant Examiner*—Callie E. Shosho
(74) *Attorney, Agent, or Firm*—Armstrong, Westerman, Hattori, McLeland & Naughton, LLP

(57) ABSTRACT

The present invention provide a method for color matching of a thermosetting powder coating composition, the method comprising the steps of: (1) dryblending two or more kinds of starting colored thermosetting powder coating compositions of different colors having an average particle size of 20 $\mu$m or less to achieve color matching, and (2) granulating the dryblend to a particle size in the range suitable for powder coating, by heating and agitating the dryblend, or by adding a specific solid binder, or by grinding and classifying a sheet or grains formed by compressing the dryblend. According to the present invention, color matching can be easily made, and a color-matched powder coating composition is obtained which is excellent in application characteristics, finished appearance and film properties.

2 Claims, No Drawings

METHOD FOR COLOR MATCHING OF POWDER COATING COMPOSITION

The present invention relates to a novel method for color matching of a thermosetting powder coating composition, the method being capable of color matching with ease.

Conventionally, color matching of powder coating compositions have been made as by the following method to realize the color specified by the user. For example, a coloring pigment is mixed with and dispersed in a powder resin, a curing agent and the like, and the obtained dispersion is mixed to melt and disperse the coloring pigment, the curing agent and the like in the powder resin using, e.g., a twin-screw dispersing device, followed by cooling, coarse grinding, fine grinding and sieving, thereby giving the contemplated color-matched powder coating composition.

The above-mentioned preparation of color-matched powder coating compositions poses no problem in preparing a large amount of powder coating composition with a specified color. However, when powder coating compositions of various colors are prepared in small amounts, namely, in the case of small-lot manufacture of paints with different colors, numerous problems are entailed which include a great loss of powder coating compositions, considerable labor, intensified contamination and so on.

In order to overcome the above-mentioned problems, a variety of methods for color matching of powder coating compositions have been proposed. For instance, WO90/06345 discloses a method wherein two or more kinds of powder coating compositions with different colors are mixed together and granulated with an aqueous acrylic resin as a granulating agent to provide a color-matched powder coating composition. Japanese Unexamined Patent Publication No.188586/1995 describes a method wherein two or more kinds of powder coating compositions are dryblended for color matching, and the dryblend is granulated with a synthetic resin as a binder. However, these conventional methods necessitate the use of an aqueous acrylic resin and a resin binder both having a high molecular weight to prevent the degradation of film properties, resulting in irregular granules due to a high viscosity of the resin components and in decrease of thermal flowabillty of the granulated powder coating composition which leads to the impairment of film properties such as surface smoothness, specular reflectance and the like.

An object of the present invention is to provide a method for color matching of a powder coating composition, the method being capable of giving a powder coating composition which achieves good finished appearance without flooding and is excellent in film properties such as surface smoothness, specular reflectance, adhesion and the like, and the method being capable of facilitating color matching and small-lot manufacture of powder coating compositions with different colors.

Other objects and features of this invention will become apparent from the following description.

According to the present invention, there is provided a method for color matching of a thermosetting powder coating composition (hereinafter referred to as "color matching method I"), the method comprising the steps of: (1) dryblending two or more kinds of starting colored thermosetting powder coating compositions of different colors having an average particle size of 20 $\mu$m or less to achieve color matching, and (2) granulating the dryblend to a particle size in the range suitable for powder coating, by heating the dryblend with agitation to a temperature at which the dryblend melts at the particle surfaces but does not melt in the particle interiors.

According to the present invention, there is also provided a method for color matching of a thermosetting powder coating composition (hereinafter referred to as "color matching method II"), the method comprising the steps of: (1) dryblending two or more kinds of starting colored thermosetting powder coating compositions of different colors having an average particle size of 20 $\mu$m or less to achieve color matching, and (2) granulating the dryblend to a particle size in the range suitable for powder coating, by (i) adding a solid binder having an average particle size of 20 $\mu$m or less and a lower melting point than the starting powder coating compositions and then (ii) heating the resulting mixture to a temperature at which the binder melts but the starting powder coating compositions do not melt.

According to the present invention, there is further provided a method for color matching of a thermosetting powder coating composition (hereinafter referred to as "color matching method III"), the method comprising the steps of: (1) dryblending two or more kinds of starting colored thermosetting powder coating compositions of different colors having an average particle size of 20 $\mu$m or less with a solid binder having an average particle size of 20 $\mu$m or less and a lower melting point than the starting powder coating compositions to achieve color matching, and (2) granulating the dryblend to a particle size in the range suitable for powder coating, by heating the dryblend to a temperature at which the binder melts but the starting powder coating compositions do not melt.

According to the present invention, there is further provided a method for color matching of a thermosetting powder coating composition (hereinafter referred to as "color matching method IV"), the method comprising the steps of: (1) dryblending two or more kinds of starting colored thermosetting powder coating compositions of different colors having an average particle size of 20 $\mu$m or less to achieve color matching, and (2) granulating the dryblend to a particle size in the range suitable for powder coating, by (i) compressing the dryblend at a pressure sufficient to melt the particle surfaces of the dryblend for forming a sheet or grains, and then (ii) grinding and classifying the sheet or grains.

The present inventors conducted extensive research to overcome the foregoing problems of the prior art and found the following solution. The solution is a method comprising dryblending two or more kinds of starting thermosetting powder coating compositions of different colors with a specific particle size to achieve color matching, and granulating the dryblend to a particle size suitable for coating, by heating and agitating the dryblend, or by adding a specific solid binder, or by grinding and classifying a sheet or grains formed by compressing the dryblend. The method makes it easy to match the color of a coating composition and produces a colored thermosetting powder coating composition excellent in application characteristics, finished appearance and film properties. The present invention was accomplished based on these novel findings.

As used herein, the term "granulate" is intended to mean "to agglomerate powder particles into granules or agglomerates having a greater diameter".

Starting Colored Thermosetting Powder Coating Composition

Colored thermosetting powder coating compositions for use as the starting materials in the color matching method of the invention each comprise a coloring pigment and a resin component comprising a curing agent and a thermosetting powder resin which is melted and fluidized when heated. The thermosetting powder resin has a softening temperature of about 30 to about 100° C.

The coloring pigment to be used herein is at least one pigment selected from white pigments, black pigments, red pigments, yellow pigments, blue pigments, green pigments, scaly aluminum powders, colored mica powders, copper powders, tin powders, and stainless steel powders. The amount of the coloring pigment to be used can be suitably selected to impart satisfactory film properties such as hiding power and surface smoothness to the film formed from the obtained powder coating composition. Although variable with the type of the pigment used, the amount of the pigment is about 0.1 to about 100 parts by weight, preferably about 1 to about 80 parts by weight, per 100 parts by weight of the powder resin component.

Examples of thermosetting powder resins include resins having a functional group which reacts with a curing agent when heated. Specific examples of such resins are acrylic resins, polyester resins, epoxy resins, fluorine-containing resins, silicone resins and hybrids of these resins. Suitable functional groups include hydroxyl, carboxyl, epoxy, blocked isocyanate, etc.

Curing agents useful herein include those having a functional group which reacts with the functional group in the powder resin to form a cured coating film and those capable of initiating polymerization of the functional group in the powder resin. Examples of curing agents for hydroxyl-containing powder resins include amino resins and blocked isocyanate compounds. Examples of curing agents for carboxyl-containing powder resins include polyepoxides and β-hydroxyethyl alkylamides. Examples of curing agents for epoxy-containing powder resins include polycarboxylic acids, initiators for cationic polymerization of epoxy groups, etc. Examples of curing agents for blocked isocyanate-containing powder resins include polyols.

Examples of amino resins include hexamethoxymelamine resin, hexaethoxymelamine resin, "Cymel 303" (tradename, a product of Mitsui Cytec. Co., Ltd.) and "Sumimal M-55" (tradename, a product of Sumitomo Chemical Co., Ltd.). Examples of blocked isocyanate compounds include those prepared by blocking an aliphatic, alicyclic or aromatic polyisocyanate with a blocking agent such as a phenol, ε-caprolactam or alcohol. The aliphatic, alicyclic or aromatic polyisocyanate may be isophorone diisocyanate, hexamethylene diisocyanate, xylylene diisocyanate, tolylene diisocyanate, hydrogenated xylylene diisocyanate, hydrogenated tolylene diisocyanate or the like. Examples of polyepoxides include homopolymers and copolymers of triglycidyl isocyanurate or glycidyl (meth)acrylate, and "Celoxide 2021" (tradename) and "EHPE-3150" (tradename) both manufactured by Daicel Industries, Co., Ltd. Examples of β-hydroxyethyl alkylamides include β-hydroxyethyl propylamide. Examples of polycarboxylic acids include adipic acid, sebacic acid, suberic acid, succinic acid, glutaric acid, maleic acid, fumaric acid, dodecanedioic acid, pimelic acid, azelaic acid, itaconic acid, citraconic acid and like aliphatic polycarboxylic acids and their anhydrides; terephthalic acid, isophthalic acid, phthalic acid, trimellitic acid, pyromellitic acid and like aromatic polycarboxylic acids and their anhydrides; and hexahydrophthalic acid, hexahydroisophthalic acid, methylhexahydrophthalic acid and like alicyclic polycarboxylic acids and their anhydrides. Examples of polyols include trimethylol-propane, sorbitol and tris(2-hydroxyethyl)isocyanurate. Examples of initiators for cationic polymerization of epoxy groups include benzyl-4-hydroxyphenyl methylsulfonium hexafluoroantimonate and benzyl-4-hydroxyphenyl methylsulfonium hexafluorophosphate.

The starting colored thermosetting powder coating compositions may contain, in addition to the powder resin, the curing agent and the coloring pigment, curing catalysts, fillers, UV stabilizers, UV absorbers, fluidity modifiers, anti-cissing agents, oil repellents, antibacterial agents, rust preventives, etc., where necessary.

The starting powder coating compositions can be prepared by conventional methods such as the melting and kneading method and lyophilizing method. The melting and kneading method comprises dryblending a powder resin, a curing agent, a coloring pigment and optionally other components in a mixer or the like, and melting and kneading the dryblend with heating, followed by cooling, coarse grinding, fine grinding and sieving. The lyophilizing method comprises dissolving or dispersing a powder resin, a curing agent, a coloring pigment and optionally other components in an organic solvent having a melting point of −40° C. or above, freezing the solution or dispersion usually at 10 to −40° C., and removing the solvent under reduced pressure for drying. Useful organic solvents include tert-butanol and dioxane.

According to the present invention, the starting powder coating compositions have an average particle size of 20 μm or less, preferably 1 to 10 μm, more preferably 1 to 8 μm. If the average particle size exceeds 20 μm, the granulated powder coating composition is given a large average particle size, thereby reducing the electrostatic coating workability and degrading the surface smoothness and the flooding resistance of the film.

In the present invention, the average particle size of the starting powder coating compositions and granulated powder coating composition is expressed in terms of a particle size with a cumulative frequency of 50%, as calculated from the results of particle size distribution analysis. The particle size distribution is analyzed using, e.g., "Microtrac" (tradename for an FRA particle size analyzer manufactured by Nikkiso K.K.).

Color Matching Method I

The color matching method I of the invention comprises the steps of: (1) dryblending two or more kinds of starting colored thermosetting powder coating compositions of different colors having an average particle size of 20 μm or less to achieve color matching, and (2) granulating the dryblend to a particle size in the range suitable for coating, by heating the dryblend to a temperature at which the dryblend melts at the particle surfaces but does not melt in the particle interiors.

(1) Color Matching Step

In the color matching method I, color matching is first conducted by dryblending two or more kinds of starting colored thermosetting powder coating compositions of different colors having an average particle size of 20 μm or less.

The color matching step is executed, for example, by dryblending two or more kinds of powder coating compositions of different colors in a high-speed mixer or the like to give a uniform mixture and inspecting the color of the mixture, whereby a dryblend of the desired color is obtained.

There is no limitation on the temperature and time involved in dryblending. Usually it is suitable to carry out the dryblending at about 5 to about 40° C., preferably about 8 to about 30° C. for about 0.5 minute to 24 hours, preferably about 1 minute to 1 hour. Further, for example, in the case of using a high-speed mixer, the mixture is agitated by an agitator revolving at about 100 to 5,000 rpm, preferably about 200 and 2,000 rpm and a chopper revolving at about 1,000 to 10,000 rpm, preferably about 2,000 to 6,000 rpm.

Optionally, relations between the mixing ratio of two or more kinds of starting powder coating compositions and the color of the resulting film may be previously input into a computer, so that the mixing ratio of two or more kinds of powder coating compositions which gives a film of the desired color can be automatically determined. In other words, the color matching step can be automated and can be more conveniently conducted by utilizing a computerized color matching method.

(2) Granulation Step

In the color matching method I, the dryblend of powder coating compositions having the desired color given in the color matching step is heated with agitation to a temperature at which the dryblend melts at the particle surfaces but does not melt in the particle interiors, to granulate the dryblend to a particle size in the range suitable for coating. Thus, the contemplated color-matched thermosetting powder coating composition is obtained.

The granulation step is performed by mixing and dispersing the dryblend with heating at a temperature at which the particles of the dryblend melt at the surfaces and adhere to each other but are not fused together or markedly deformed.

The temperature conditions for granulation vary with the softening temperature and melting viscosity of the starting coating compositions, the production amount and other factors, and thus suitable conditions are selected according to the starting powder coating compositions used and other factors. Generally, the granulation is conducted at a temperature of about 40 to 80°0 C., preferably about 40 to 60° C. for about 1 minute to 20 hours, preferably about 5 minutes to 10 hours.

Color Matching Method II

The color matching method II comprises the steps of (1) dryblending two or more kinds of starting colored thermosetting powder coating compositions of different colors having an average particle size of 20 $\mu$m or less to achieve color matching, and (2) granulating the dryblend to a particle size in the range suitable for coating, by (i) adding a solid binder having an average particle size of 20 $\mu$m or less and a lower melting point than the starting powder coating compositions and (ii) heating the resulting mixture to a temperature at which the binder melts but the starting powder coating compositions do not melt.

(1) Color Matching Step

The color matching step in the color matching method II can be carried out in the same manner as in the color matching method I.

(2) Granulation Step

In the color matching method II, the solid binder is added to the dryblend obtained in the color matching step, and the mixture is agitated and dispersed with heating at a temperature at which the binder melts but the starting powder coating compositions do not melt, whereby the melted binder binds the particles of the starting powder coating compositions to each other to granulate the dryblend to a particle size in the range suitable for coating. As the result, the contemplated color-matched thermosetting powder coating composition is obtained.

The temperature conditions for granulation vary with the softening temperature, melting point and melting viscosity of the starting coating compositions and the binder, the production amount and other factors. Thus, suitable conditions are selected according to the starting powder coating compositions used and other factors. Generally, the granulation is conducted at about 20 to 80° C., preferably about 30 to 60° C. for about 1 minute to 20 hours, preferably about 5 minutes to 10 hours.

Preferred as the solid binder is at least one binder having a lower melting point than the starting powder coating compositions and selected from the group consisting of resins, curing agents for the starting powder coating compositions, higher alcohols, monobasic acids and waxes. Examples of resins include acrylic resins, polyester resins, epoxy resins and fluorocarbon resins. Examples of curing agents include polycarboxylic acids, carboxylic anhydrides, blocked isocyanate compounds, polyol compounds and amino resins. Examples of higher alcohols include cetyl alcohol and stearyl alcohol. Examples of monobasic acids include lauric acid, myristic acid, palmitic acid, stearic acid and behenic acid. Examples of waxes include polyethylene wax, paraffin wax, carnauba wax, microcrystalline wax and montan wax. It is usually preferable that the binder have a melting point of about 10 to 70° C., particularly about 20 to 60° C.

The amount of the solid binder to be added varies with the melting temperature, binding properties and viscosity of the binder, and other factors. Thus, a suitable amount is selected according to the binder and starting powder coating compositions used. It is usually suitable to add the binder in an amount of about 0.1 to 50 wt. %, preferably about 3 to 30 wt. %, relative to the starting powder coating compositions.

The solid binder can be dryblended with the starting powder coating compositions after grinding the binder to an average particle size of 20 $\mu$m or less, preferably about 1 to 10 $\mu$m in a jet mill or like apparatus.

Color Matching Method III

The color matching method III comprises the steps of: (1) dryblending two or more kinds of starting colored thermosetting powder coating compositions of different colors having an average particle size of 20 $\mu$m or less with a solid binder having an average particle size of 20 $\mu$m or less and a lower melting point than the starting powder coating compositions to achieve color matching, and (2) granulating the dryblend to a particle size in the range suitable for coating, by heating the dryblend to a temperature at which the binder melts but the starting powder coating compositions do not melt.

(1) Color Matching Step

The color matching step in the color matching method III can be performed in the same manner as in the color matching method I, except that the solid binder is dryblended with the two or more kinds of starting colored powder coating compositions. Alternatively, the binder may be blended with the components of the starting powder coating compositions when preparing said compositions, and melted, kneaded and ground together with the components.

Specific examples, average particle size and amount to be added of useful binders are the same as in the color matching method II.

(2) Granulation Step

In the color matching method III, the dryblend obtained in the color matching step is mixed and dispersed with heating at a temperature at which the starting powder coating compositions do not melt but the solid binder melts to bind the particles of the starting powder coating compositions to each other, thereby granulating the dryblend to a particle size in the range suitable for coating. Thus, the contemplated color-matched thermosetting powder coating composition is obtained.

The temperature conditions for granulation are the same as in the color matching method II.

Color Matching Method IV

The color matching method IV comprises the steps of: (1) dryblending two or more kinds of starting colored thermosetting powder coating compositions of different colors having an average particle size of 20 $\mu$m or less to achieve color matching, and (2) granulating the dryblend to a particle size in the range suitable for powder coating, by (i) compressing the dryblend at a pressure sufficient to melt the particle surfaces of the dryblend for forming a sheet or grains, and then (ii) grinding and classifying the sheet or grains.

(1) Color Matching Step

The color matching step in the color matching method IV can be performed in the same manner as in the color matching method I.

(2) Granulation Step

In the color matching method IV, the dryblend obtained in the color matching step is compressed at a pressure sufficient to melt the particle surfaces of the dryblend for forming a sheet or grains, and the sheet or grains are ground and classified to a particle size in the range suitable for powder coating. Thus, the contemplated color-matched thermosetting powder coating composition is obtained.

The pressure to be applied varies with the softening temperature and melting viscosity of the starting powder coating compositions, the production amount and other factors. Thus, a suitable pressure is selected according to the starting powder coating compositions used and other factors. It is generally suitable to apply a pressure of about 100 to 10,000 Kg/cm$^2$, preferably about 500 to 4,000 Kg/cm$^2$. If the pressure applied is less than 100 Kg/cm$^2$, the particles of the starting compositions do not sufficiently adhere to each other, so that the sheet or grains, when being ground, separate into the particle size of the starting compositions. On the other hand, if a pressure over 10,000 Kg/cm$^2$ is applied, the particles of the starting compositions are fused together to form a solid product which does not consist of granules but has uniform structure. As the result, small particles that have not been granulated will be present in the obtained powder coating composition, reducing the application workability.

In the color matching method IV, a compression apparatus is used which comprises a transfer unit for microfine powders and a compression unit. Examples of such apparatus include "Roller Compactor RCP-200H" (tradename) and "Roller Compactor MRCP-200" (tradename), both manufactured by Kurimoto, Ltd.

The compressed product is finely ground using a pin disc or like means, and sieved through a suitable sieve for classification, whereby the contemplated granulated powder coating composition suitable for powder coating is obtained.

In the granulation step, at least one of the aqueous binders, solid binders, aqueous organic solvents, aqueous surfactant solutions and the like may be used for promoting granulation.

The particles of the thus obtained granulated powder coating composition of the invention are agglomerates each made of several particles of the starting compositions. It is preferable that, in the agglomerates, the particles of the starting compositions substantially retain their shape before granulation, and adhere to each other so as not to separate into particles during transfer from a paint tank to an electrostatic coating apparatus or during electrostatic spray coating.

The color-matched granulated powder coating compositions obtained by the methods I to IV have an average particle size in the range suitable for powder coating, i.e., generally about 10 to about 50 $\mu$m, preferably about 12 to about 25 $\mu$m. If the average particle size is below the range, the coating composition tends to deposit with a lower efficiency when applied by electrostatic coating operation, whereas above the range, the resulting coating film tends to be given a lower surface smoothness. Therefore, an average particle size outside the foregoing range is undesirable.

The color-matched powder coating composition obtained by the present method is applied to a substrate and baked to form a cured coating film.

The substrate may be any of conventional substrates which can be used in powder coating. Examples of useful substrates include metals, surface-treated metals, plastics, these substrates coated with a coating composition, etc. The powder coating operation can be carried out by conventional methods, for example, electrostatic powder coating methods, frictionally electrified powder coating methods, fluidization dip coating methods, etc. There is no limitation on the film thickness. However, it is suitable that the obtained film have a thickness of about 20 to 200 $\mu$m, preferably about 20 to 150 $\mu$m, more preferably about 20 to 80 $\mu$m, when cured. The deposited composition is baked at a temperature of about 100 to 250° C., preferably about 160 to 200° C. for about 3 to 120 minutes, preferably about 20 to 40 minutes.

The color-matched powder coating composition obtained by the present method can be used, without limitation, in applications in which conventional powder coating compositions are used, such as automobiles, electric appliances, furniture made of steel, office goods, construction materials, pipes, etc.

The present invention will be described in detail with reference to the following Examples and Comparative Examples in which all parts and percentages are by weight. The present invention is not limited at all to these examples.

The starting powder coating compositions used in the Examples and Comparative Examples are as follows:

(1) "Everclad #4800 White": tradename of Kansai Paint Co., Ltd., a blocked isocyanate-curable polyester resin powder coating composition with an average particle size of about 5 $\mu$m and a melting point of about 82° C. (as determined by differential scanning calorimetry), which is white in color and forms a coating film with a lightness value L* of about 95 in L*a*b* color specification system (JIS Z 8729); and (2) "Everclad #4800 Gray": tradename of Kansai Paint Co., Ltd., a blocked isocyanate-curable polyester resin powder coating composition with an average particle size of about 5 $\mu$m and a melting point of about 85° C. (as determined by differential scanning calorimetry), which is gray in color and forms a coating film with a lightness value L* of about 70 in L*a*b* color specification system (JIS Z 8729).

EXAMPLE 1

100 g of Everclad #4800 White and 100 g of Everclad #4800 Gray were placed in a high-speed mixer (a product of Fukae Kogyo K.K., 2 liter volume), and dryblended by agitation for 1 minute using an agitator (600 rpm) and a chopper (4,000 rpm). The dryblend was heated at 50° C. for 30 minutes while continuing the agitation under the same agitation conditions, to form granules. The granules were cooled to 20° C. over a period of 15 minutes to thereby obtain a color-matched granulated powder coating composition.

EXAMPLE 2

The procedure of Example 1 was repeated with the exception that the dryblend was heated at 60° C. to form granules. Thus, a color-matched granulated powder coating composition was obtained.

EXAMPLE 3

Stearyl alcohol (tradename "Kalcol 8098", a higher alcohol manufactured by Kao Corp., having a melting point of 59° C.) was finely ground in a jet mill and sieved, giving a solid binder having an average particle size of about 6 µm.

200 parts of the same dryblend as used in Example 1 and 20 parts of the solid binder were placed in a high-speed mixer (a product of Fukae Kogyo K.K., 2 liter volume), and heated at 50° C. for 30 minutes with agitation using an agitator (500 rpm) and a chopper (4,000 rpm), to form granules. The granules were cooled to 20° C. over a period of 15 minutes to thereby obtain a color-matched granulated powder coating composition.

EXAMPLE 4

Stearyl alcohol (tradename "Kalcol 8098", a higher alcohol manufactured by Kao Corp., having a melting point of 59° C.) was finely ground in a jet mill and sieved, giving a solid binder having an average particle size of about 6 µm.

100 g of Everclad #4800 White, 100 g of Everclad #4800 Gray and 20 g of the solid binder were placed in a high-speed mixer (a product of Fukae Kogyo K.K., 2 liter volume), and dryblended using an agitator (500 rpm) and a chopper (4,000 rpm) for 1 minute. The dryblend was heated at 50° C. for 30 minutes while continuing agitation under the same agitation conditions, to form granules. The granules were cooled to 20° C. over a period of 15 minutes to thereby obtain a color-matched granulated powder coating composition.

EXAMPLE 5

(1) Preparation of Glycidyl-containing Vinyl Copolymer Resin A-1

1,000 parts of toluene was placed in an ordinary reaction vessel for vinyl resin synthesis equipped with a stirrer, a thermometer and a reflux condenser, and agitated with heating. When the toluene started to be refluxed, added dropwise over a period of about 2 hours was a mixture of 7 parts of a polymerization initiator (azobisdimethylvaleronitrile) and a monomer mixture consisting of 35 parts of glycidyl methacrylate, 15 parts of styrene, 25 parts of methyl methacrylate and 25 parts of n-butyl acrylate. After completion of addition, reflux was continued for further 3 hours, and then terminated to allow the toluene to flow out of the reaction vessel. When the temperature of the content of the reaction vessel reached 150° C., the remaining toluene was distilled off under reduced pressure. The mixture remaining in the reaction vessel was cooled to obtain a glycidyl-containing vinyl copolymer resin A-1. The resin A-1 had a number average molecular weight of about 3,000 and a softening point of about 80° C.

(2) Preparation of White Powder Coating Composition 1,000 parts of the resin A-1, 290 parts of dodecanedioic acid and 1,000 parts of a titanium white pigment were dryblended in a Henschel mixer. The dryblend was melted and kneaded for dispersion in a twin-screw extruder, and cooled and coarsely ground. The coarse grains were finely ground in a Jet mill and sieved to thereby obtain a thermosetting acrylic resin powder coating composition having an average particle size of about 6 µm and a melting point of 52° C. (as determined by differential scanning calorimetry). The obtained composition was a white powder coating composition which forms a coating film with a lightness value L* of about 96 in L*a*b* color specification system (JIS Z 8729).

(3) Preparation of Black Powder Coating Composition 1,000 parts of the resin A-1, 290 parts of dodecanedioic acid and 10 parts of carbon black were dryblended in a Henschel mixer. The dryblend was melted and kneaded for dispersion in a twin-screw extruder, cooled and coarsely ground. The coarse grains were finely ground in a jet mill and sieved to thereby obtain a thermosetting acrylic resin powder coating composition having an average particle size of about 6 µm and a melting point of 52° C. (as determined by differential scanning calorimetry). The obtained composition was a black powder coating composition which forms a coating film with a lightness value L* of about 10 in L*a*b* color specification system (JIS Z 8729).

(4) Preparation of Glycidyl-containing Vinyl Copolymer Resin A-2

A glycidyl-containing vinyl copolymer resin A-2 was prepared by repeating the procedure of preparation of the glycidyl-containing vinyl copolymer resin A-1 except that the polymerization initiator was used in an amount of 11 parts. The resin A-2 had a number average molecular weight of about 1,000, and a softening point of about 40° C.

(5) Preparation of Solid Binder 1,000 parts of the glycidyl-containing vinyl copolymer resin A-2 and 290 parts of dodecanedioic acid were dryblended in a Henschel mixer. The dryblend was melted and kneaded for dispersion in a twin-screw extruder, cooled and coarsely ground. The coarse grains were finely ground in a jet mill and sieved to thereby obtain a thermosetting acrylic resin powder coating composition having an average particle size of about 6 µm and a melting point of 20° C. (as determined by differential scanning calorimetry). The obtained composition was used as a solid binder.

(6) Preparation of Color-matched Granulated Powder Coating Composition 1,000 parts of the white powder coating composition prepared in (2), 100 parts of the black powder coating composition obtained in (3) and 20 parts of the solid binder obtained in (5) were placed in a high-speed mixer, and heated at 40° C. for 30 minutes with agitation using an agitator (500 rpm) and a chopper (4,000 rpm), to form granules. The granules were cooled to 20° C. over a period of 15 minutes to thereby obtain a color-matched granulated powder coating composition.

EXAMPLE 6

1,000 parts of the white powder coating composition obtained in Example 5-(2) and 100 parts of the black powder coating composition obtained in Example 5-(3) were placed in a high-speed mixer, and heated at 45° C. for 30 minutes with agitation using an agitator (500 rpm) and a chopper (4,000 rpm), to form granules. The granules were cooled to 20° C. over a period of 15 minutes to thereby obtain a color-matched granulated powder coating composition.

EXAMPLE 7

2,000 parts of the same dryblend as used in Example 1 and 50 parts of stearyl alcohol (tradename "Kalcol 8098", a product of Kao Corp.) which had been ground to an average particle size of 6 µm were dryblended in a Henschel mixer.

The resulting mixture was compressed at a pressure of 1,000 Kg/cm² using "Roller Compactor RCP-200H" (tradename, a product of Kurimoto Ltd.) to allow the particle surfaces of the starting powder coating compositions to melt and adhere to each other, giving grains having a particle size of about several millimeters. The grains were ground using a pin disc, and sieved for classification to thereby obtain a color-matched granulated powder coating composition.

Comparative Example 1

The same dryblend as used in Example 1 was employed as a comparative color-matched powder coating composition.

Comparative Example 2

1,000 parts of the white powder coating composition obtained in Example 5-(2) and 100 parts of the black powder coating composition obtained in Example 5-(3) were placed in a high-speed mixer and agitated for 30 minutes using an agitator (500 rpm) and a chopper (4,000 rpm), without heating, to thereby obtain a comparative color-matched powder coating composition.

The properties, application characteristics and film properties of each of the powder coating compositions prepared in the Examples and Comparative Examples were tested by the following methods.

Properties of Coating Composition

Repose angle: The powder coating composition was made to flow onto a circular table and then an angle of the ridgeline of the heap formed to a horizontal line was determined using "Powder Tester" (tradename of Hosokawamicron Co., Ltd.). The smaller the angle, the higher the flowability of the powder coating composition.

Bulk density (g/cm³): The apparent density of the powder coating composition was determined according to JIS K 5101 20. The higher the bulk density, the higher the flowability of the powder coating composition.

Average particle size ($\mu$m): The particle size distribution was measured using "Microtrac" (tradename for an FRA particle size analyzer manufactured by Nikkiso K.K.). The average particle size is expressed in terms of a particle size with a cumulative frequency of 50% (D50), as calculated from a curve indicating the cumulative frequency of the particle size based on the total volume of the powder composition.

Application Characteristics

Application workability: The powder coating composition was applied on a tin plate (300 mm×300 mm) placed perpendicularly, using an electrostatic coating apparatus (tradename "PG-1", a product of Matsuo Sangyo K.K.), to a thickness of 50 $\mu$m (when cured). The conditions for electrostatic powder coating were as follows: applied voltage; −70 KV, delivery; 150 g/min, gun distance (distance between the gun tip and the substrate surface); 200 mm, application time; 10 seconds. The application workability was evaluated according to the following criteria:

A; Good application workability (the delivery was even, and there was no sticking of the coating composition to the gun tip),
B; Poor application workability (the delivery was uneven, and there was sticking of the coating composition to the gun tip),
C; Markedly poor application workability (the delivery was considerably uneven, and there was noticeable sticking of the coating composition to the gun tip).

Coating efficiency: The electrostatic powder coating operation was carried out in the same manner as in the application workability test, and the coating efficiency was calculated according to the following quation:

coating efficiency(%)=(coating weight/delivery weight)×100

Film Properties
(Production of Coated Plate)

The powder coating composition was applied to a zinc phosphate-treated steel plate by an electrostatic coating operation to a thickness of 60 $\mu$m (when baked). The coating was baked at 180° C. for 30 minutes. The obtained coated plate was subjected to the following tests.

Surface smoothness: The surface of the coating film was visually inspected to evaluate the surface smoothness of the film according to the following criteria:

A; substantially no change such as shrinkage occurred,
B; a change such as shrinkage occurred,
C; a marked change such as shrinkage occurred.

Specular reflectance (%): A specular reflectance at an angle of 60° was measured according to JIS K 5400.

Flooding resistance: The surface of the coating film was visually inspected to evaluate the resistance to flooding according to the following criteria:

A; no flooding existed,
B; slight flooding existed,
C; marked flooding existed.

Erichsen value: A breaking distance (mm) was determined according to JIS K 5400 8.2 by forcing a steel ball into the coating film until rupture or peel occured in the film. The breaking distance was expressed as an Erichsen value which is an index indicative of the adhesion of the film. The greater the Erichsen value, the higher the adhesion.

Lightness of the film: The lightness of the film was expressed in a lightness value L* in the L*a*b* color specification system (JIS Z 8729).

Table 1 shows the properties, application characteristics and film properties of the powder coating compositions.

TABLE 1

|  | Example | | | | | | | Com. Ex. | |
| --- | --- | --- | --- | --- | --- | --- | --- | --- | --- |
|  | 1 | 2 | 3 | 4 | 5 | 6 | 7 | 1 | 2 |
| Properties of coating composition | | | | | | | | | |
| Repose angle (degree) | 42 | 39 | 40 | 40 | 40 | 40 | 40 | 65 | 63 |
| Bulk density (g/cm³) | 0.48 | 0.50 | 0.51 | 0.51 | 0.50 | 0.50 | 0.52 | 0.37 | 0.38 |

TABLE 1-continued

|  | Example | | | | | | | Com. Ex. | |
| --- | --- | --- | --- | --- | --- | --- | --- | --- | --- |
|  | 1 | 2 | 3 | 4 | 5 | 6 | 7 | 1 | 2 |
| Average particle size ($\mu$m) | 14 | 21 | 20 | 20 | 20 | 20 | 22 | 5 | 6 |
| Application characteristics | | | | | | | | | |
| Application workability | B | A | A | A | A | A | B | C | C |
| Coating efficiency | 70 | 75 | 74 | 74 | 76 | 76 | 71 | 30 | 31 |
| Film properties | | | | | | | | | |
| Surface smoothness | A | A | A | A | A | A | A | A | A |
| Specular reflectance (%) | 90 | 91 | 92 | 91 | 89 | 90 | 90 | 75 | 72 |
| Flooding resistance | A | A | A | A | A | A | A | C | C |
| Erichsen value (mm) | 7< | 7< | 7< | 7< | 7< | 7< | 7< | 7< | 7< |
| Lightness of the film (L*) | 84 | 84 | 84 | 84 | 85 | 85 | 85 | 77 | 78 |

According to the present invention, the following remarkable results can be achieved: color matching can be easily made; small lots of powder coating compositions of different colors can be easily manufactured; and a color-matched powder coating composition can be obtained which is excellent in application characteristics such as application workability and coating efficiency, the composition having good finished appearance without flooding and being outstanding in film properties such as surface smoothness, specular reflectance and adhesion.

What is claimed is:

1. A method for color matching of a thermosetting powder coating composition, the method comprising the steps of: (1) dryblending two or more kinds of starting colored thermosetting powder coating compositions of different colors having an average particle size of 20 $\mu$m or less to achieve color matching, and (2) granulating the dryblend to a particle size in the range suitable for powder coating, by (i) adding a solid binder having an average particle size of 20 $\mu$m or less and a lower melting point than the starting powder coating compositions and (ii) heating the resulting mixture to a temperature at which the binder melts but the starting powder coating compositions do not melt, the solid binder being at least one member selected from the group consisting of higher alcohols and monobasic acids.

2. A method for color matching of a thermosetting powder coating composition, the method comprising the steps of: (1) dryblending two or more kinds of starting colored thermosetting powder coating compositions of different colors having an average particle size of 20 $\mu$m or less with a solid binder having an average particle size of 20 $\mu$m or less and a lower melting point than the starting powder coating compositions to achieve color matching, and (2) granulating the dryblend to a particle size in the range suitable for powder coating, by heating the dryblend to a temperature at which the binder melts but the starting powder coating compositions do not melt, the solid binder being at least one member selected from the group consisting of higher alcohols and monobasic acids.

* * * * *